United States Patent [19]

Fennessy, Sr.

[11] Patent Number: 5,061,172

[45] Date of Patent: Oct. 29, 1991

[54] APPARATUS FOR FORMING A DECORATIVE IMPRESSION IN A MOLDABLE MATERIAL

[76] Inventor: Paul M. Fennessy, Sr., 17 Blackwood Dr., Liverpool, N.Y. 13090

[21] Appl. No.: 585,952

[22] Filed: Sep. 21, 1990

[51] Int. Cl.⁵ .............................. B29C 59/02
[52] U.S. Cl. .................... 425/385; 404/89; 404/93
[58] Field of Search ............ 425/383, 385, 458; 404/89, 93

[56] References Cited

U.S. PATENT DOCUMENTS

| D. 282,623 | 2/1986 | Nasvik | D8/45 |
|---|---|---|---|
| 1,096,445 | 5/1914 | McKesson | 404/133 |
| 1,807,024 | 5/1931 | Anderson | 425/385 |
| 3,887,293 | 6/1975 | Bowman | 404/72 |
| 3,930,740 | 1/1976 | Bowman | 404/9 |
| 4,131,406 | 12/1978 | Fresquez | 425/385 |
| 4,135,840 | 1/1979 | Puccini et al. | 404/93 |
| 4,231,677 | 11/1980 | Roming | 404/89 |
| 4,776,723 | 10/1988 | Brimo | 404/89 |
| 4,798,364 | 1/1989 | Scott | 249/189 |
| 4,828,426 | 5/0189 | Hendricks et al. | 404/93 |
| 4,838,728 | 6/1989 | McKeever | 404/89 |

FOREIGN PATENT DOCUMENTS

| 50-22073 | 7/1975 | Japan | 425/385 |
|---|---|---|---|
| 2111897 | 7/1983 | United Kingdom . | |
| 2176826 | 1/1987 | United Kingdom . | |
| 2214211 | 8/1989 | United Kingdom | 404/93 |

Primary Examiner—Willard E. Hoag
Attorney, Agent, or Firm—Shlesinger, Arkwright and Garvey

[57] ABSTRACT

The present invention is directed to an apparatus for forming a decorative impression in a moldable material and a method of manufacturing the same. Specifically, a preferred embodiment of the present invention is directed to stamping tool for forming decorative patterns in concrete. The stamping tool includes a multi-layered flexible base including first, second and third layers. The first, second and third layers each include an upper and a lower surface. The second layer is positioned intermediate, the first and third layers. The lower surface of the third layer has a predetermined pattern formed therein for forming a corresponding impression in the moldable material. A pair of closed looped handles are secured to the base for permitting the tool to be readily transported from one location to another. The handles include a substantially concave segment disposed above the base and a substantially convex segment embedded therein. The first and second layers each include raised portions adjacent each of the handles for rigidly securing the handles to the base. The second layer has a color different from the first and third layers thereby permitting an individual to readily determine whether the tool has been properly formed from a visual inspection thereof.

17 Claims, 2 Drawing Sheets

5,061,172

APPARATUS FOR FORMING A DECORATIVE IMPRESSION IN A MOLDABLE MATERIAL

The present invention generally relates to implements used for forming patterns in a moldable material. More specifically, a preferred embodiment of the present invention is directed to a stamping tool for forming decorative patterns in concrete.

BACKGROUND OF THE INVENTION

It has previously been known to use stamping tools to form decorative patterns in concrete to provide the appearance of, for example, ashlar slate, cobblestone, fieldstone, brick, and the like hand-laid materials. There are numerous advantages to using concrete as opposed to hand-laid materials. Specifically, concrete provides a durable pattern at a considerably reduced cost. Also, hand-laid materials generally settle randomly causing a particular structure to have an uneven surface that is extremely unsightly and hazardous. Moreover, vegetation as well as other debris is commonly present between adjacent hand-laid materials. This is not only unsightly but can likely lead to extensive damage to the structure.

The following patent documents illustrate a variety of tools which have been used to form decorative patterns in concrete: U.S. Pat. Nos. 1,096,445; 3,887,293; 3,930,740; 4,131,406; 4,135,840; 4,231,677; 4,776,723; 4,798,364; 4,828,426; 4,838,728; Des. 282,623; and U.K. Patent application Nos. 2,214,211A; 2,176,826A; and 2,111,897A. The aforementioned patent documents generally illustrate two types of tools. The first type of tool forms decorative grout lines in concrete. However, these tools lack the capability to form texturized surfaces in the concrete to provide the authentic appearance of, for example, slate or other hand-laid materials.

The second type of tool forms both decorative grout lines as well as texturized surfaces in the concrete. The preferred embodiment of the present invention is directed to the latter type of tool. Previously known tools of this type are illustrated in U.S. Pat. No. 4,776,723; U.S. Pat. No. Des. 282,623 and U.K. Patent Application No. 2,111,897A. These tools have several disadvantages inherent thereto. The '897A patent tool lacks a memory, i.e. the tool includes a rigid core which would likely prevent the tool from assuming its original shape once deformed by an external source. Accordingly, the tool must be discarded if deformed.

The '723 patent tool includes a pair of straps which permit a laborer to transport it to a desired location. Each strap includes a pair of ends which are simply placed in the elastomer during the molding process and allowed to harden. However, after prolonged use of this type of tool, it is likely that the straps will severe from the body of the tool due to the tenuous connection therebetween.

Additionally, it is desirable to uniformly distribute the weight of tools used to form grout lines as well as texturized surfaces over the entire area thereof. A tool so formed will avoid unintended and unsightly deformations in the concrete. However, it has not previously been possible to readily determine whether tools of this type have been so formed from a visual inspection thereof.

OBJECTS AND SUMMARY OF THE PRESENT INVENTION

It is an object the present invention to provide a tool for forming decorative patterns in concrete which overcomes the aforementioned disadvantages of the prior art.

Another object of the present invention is to provide a multi-layered tool, one layer of which has a different color from the other layers for readily indicating whether the tool has been properly formed.

A further object of the present invention is to provide a multi-layered tool formed from a material having a memory such that the tool can readily resume its original form after deformation by an external source.

Yet another object of the present invention is to provide a multi-layered tool having a pair of handles, a substantial portion of each of said handles being embedded in a body portion of the tool for rigidly securing the same thereto.

Still another object of the present invention is to provide a multi-layered tool for forming decorative grout lines and texturized surfaces which can be repeatedly reused.

Yet a further object of the present invention is to provide a multi-layered stamping tool which can be readily interconnected with adjacently positioned tools.

Yet still a further object of the present invention is to provide a multi-layered stamping tool having a pair of handles with at least two layers having raised portions adjacent each of the handles for rigidly securing the handles to the body portion of the tool.

Still a further object of the present invention is to provide a multi-layered stamping tool for forming decorative patterns in a moldable material which can be readily and inexpensively manufactured.

These and other objects and advantages of the present invention will be readily apparent from the following description of the preferred embodiment of the present invention.

DETAILED DESCRIPTION OF THE DRAWINGS

DETAILED DESCRIPTION OF THE INVENTION

The preferred embodiment of the present invention will hereinafter be described.

Figure 1:
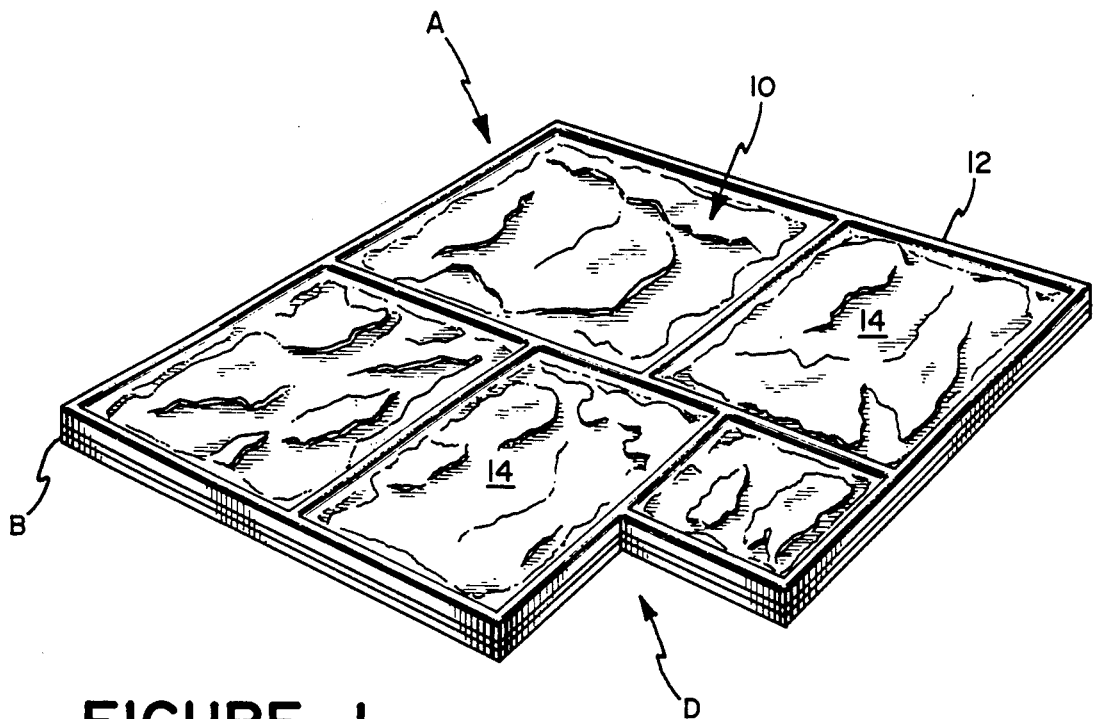
FIG. 1 is a perspective view of the preferred embodiment of the present invention as seen from the underside thereof.
Figure 2:
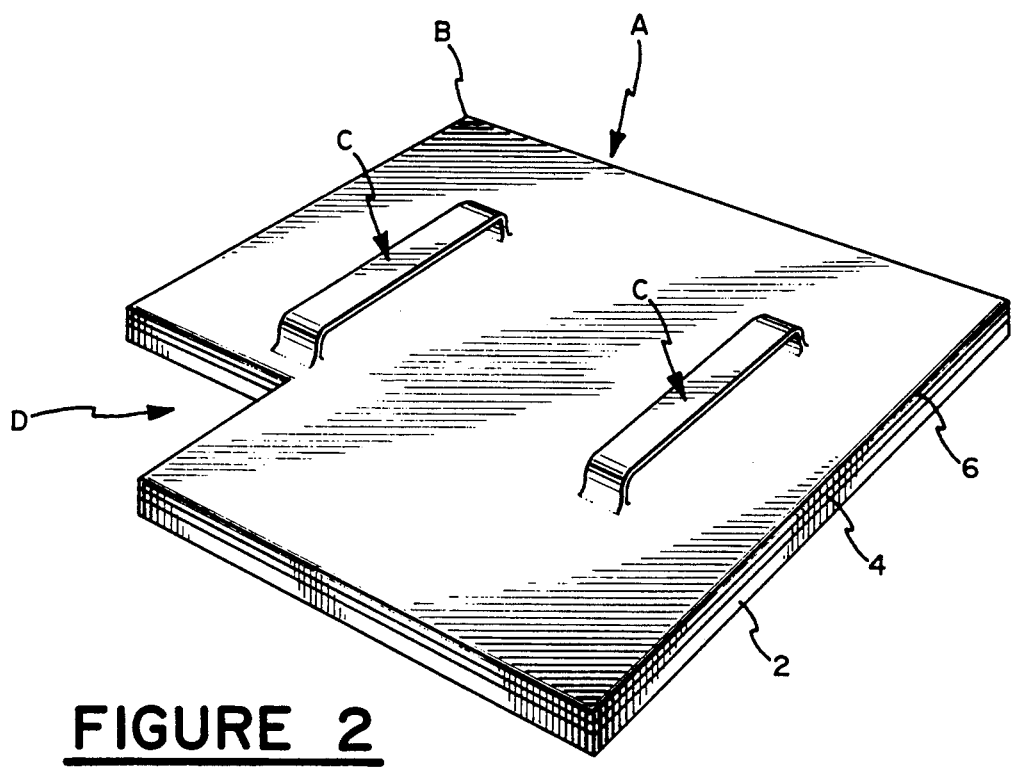
FIG. 2 is a perspective view of the preferred embodiment of the present invention as seen from above.

Referring to FIGS. 1 and 2, a multi-layered decorative stamping tool A includes a base B and a pair of closed loop handles C. The base B has a right angled cut-out D formed therein. The base B includes a bottom layer 2, an intermediate layer 4 and a top layer 6. Each of the layers 2, 4 and 6 are formed from a flexible elastomeric material having a memory. The preferred flexible elastomeric material maybe formed by molding and curing liquid polyurethanes. The polyurethanes are generally poly-functional long chain alcohols with a plurality of hydroxyl groups reacted with a polyiscocyanate. The polyurethanes themselves are esters of dicarbamic acids and glycols or inter-molecular esters of gamma-hydroxic carbamic acids. The polyurethane elastomers are made from diiscocyanates, aliphatic polyesters, etc. Several types of polyurethanes are commercially available as two-part pourable liquids, which have a good shelf life and are easily mixed with the necessary polymerizing or curing agent. One form is a polyester made from ethylene and propylene glycols with adipic acid. A curing agent such as toluene, naphthalene or diphenylmethane diisocyanates maybe used. The resultant polymer should have the hardness, tensile modules, elongation, tear strength, tensile strength, and abrasion resistance which is common for materials used for tools to form decorative patterns in concrete. Other suitable material and synthetic resins may be used. A hardness similar to automotive tire rubber is preferred to avoid too much deformation. Wicking during curing is essential to the product as will be subsequently discussed.

The bottom layer 2 has a predetermined pattern 10 formed therein which includes a plurality of grout lines 12 and texturizing areas 14. As seen in FIG. 1, the texturizing areas 14 will provide the concrete structure with a slate appearance. It will be readily appreciated that the texturized areas 14 maybe modified to provide concrete with the appearance of any desired hand-laid material.

In the preferred embodiment, the bottom layer 2 has a thickness of approximately one half inch. The intermediate layer 4 and top layer 6 each have a thickness of approximately one quarter of an inch. The intermediate layer 4 is formed from a first color, for example, light blue while bottom layer 2 and top layer 6 are formed from a second color, for example, dark blue. The significance of this feature will be discussed in detail below.

Figure 4:
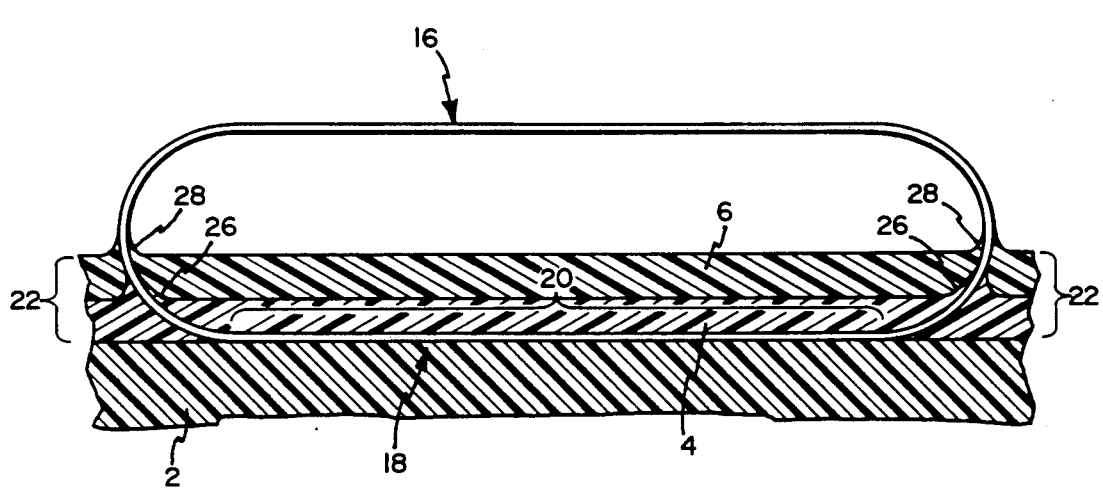
FIG. 4 is a cross-sectional view of the tool illustrated in FIG. 2.

Referring to FIG. 4, the closed looped straps C preferably of fabric nylon each include a substantially convex section 16 disposed above the base B and a substantially concave section 18 embedded therein. The substantially concave section 18 includes a first segment 20 extending along the upper surface of bottom layer 2 and second and third segments 22 and 24, respectively, which are disposed at opposite ends of first segment 20. Raised or wicked portions 26 of substantially triangularly shaped cross-section are formed, by wicking of the elastomeric material, in the upper surface of intermediate layer 4 adjacent second and third segments 22 and 24. Similarly, raised portions 28, substantially triangularly shaped in cross-section, are formed in the upper surface of top layer 6 adjacent first and second segments 22 and 24. The raised or wicked portions 26 and 28 rigidly secure the straps C to base B. Moreover, positioning first segment 20 between the upper surface of bottom layer 2 and the lower surface of intermediate layer 4 further strengthens the connection between base B and closed looped straps C. The significance of these features is readily appreciated when considering that tools A are repeatedly reused and weigh from between approximately 15 lbs. to 35 lbs. Fabric which has a loose weave will wick more than fabric with a tight weave. Even straps made from a solid plastic will wick due to surface tension. Wicking is important to the life of the product.

Raised portions 26 serve to lock the belt C to the base B by structurally adding a substantial thickness dimension to the straps or belts C along the horizontal interface of layers 4 and 6. Raised portions 28 increase the vertical amount of plastic from the layer 2 above the top layer 6 thus requiring an increased stripping force to dislodge the straps C.

In the preferred embodiment, the handles C are formed from the same material as seat belts straps commonly used in automobile vehicles. It will be readily appreciated that various other durable materials could be used for forming handles C.

METHOD OF MANUFACTURE

The preferred method of forming a decorative stamping tool formed in accordance with the present invention will now be described.

Figure 3:
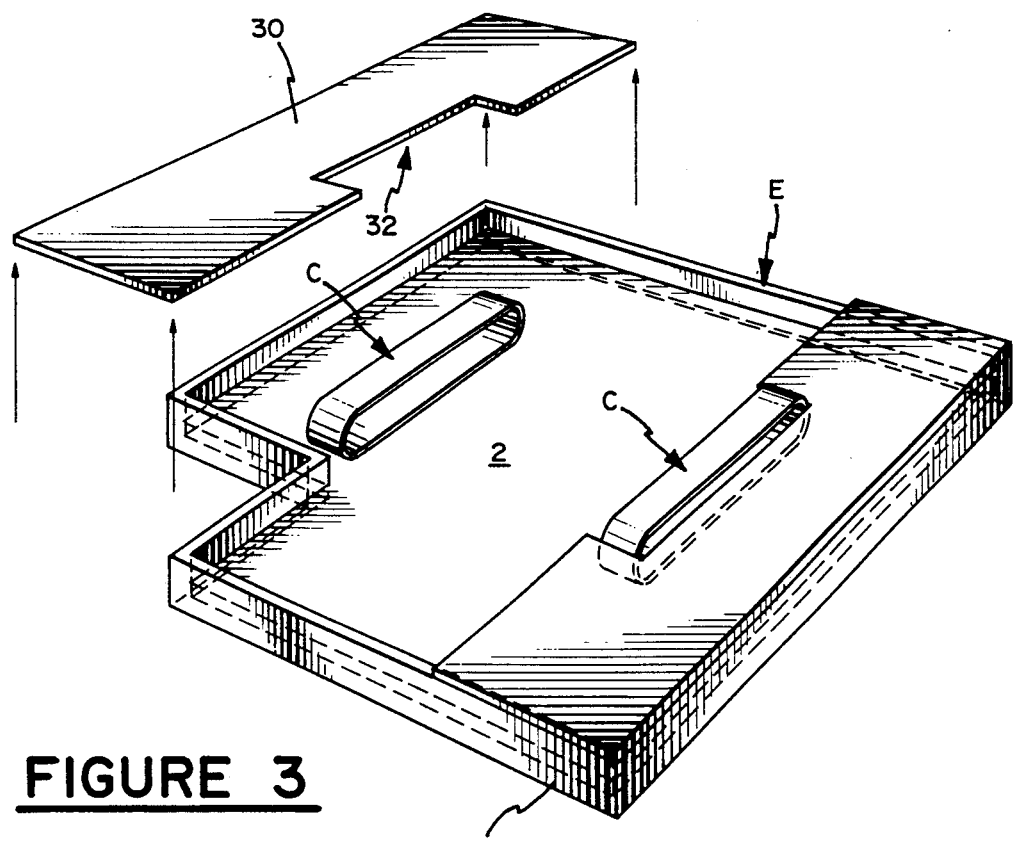
FIG. 3 is a perspective view of a mold having a partially formed tool therein.

Referring to FIG. 3, a mold E is used to form the tool A. The mold E includes side walls F and a floor (not shown). The floor is configured to form the desired pattern in the tool A. For example, if it is desired to provide tool A with an ashlar slate pattern, the surface of the floor is provided with a corresponding texture.

An elastomeric material is dispensed into a suitable container and is subsequently mixed with a colored dye to provide the bottom layer 2 with a first color, for example, dark blue. The container is weighed to determine whether the appropriate amount of elastomeric material is contained therein to form the bottom layer 2 with approximately a half inch thickness. The contents of the container are dispensed into mold E. Once the bottom layer 2 has hardened, closed looped straps C are positioned on the upper surface thereof using a template 30. The template 30 includes a notch 32 formed therein for receiving closed-looped straps C. As seen in FIG. 3, the template 30 is aligned with the sidewalls of mold E, and straps C are positioned in the notch 32. Subsequently, the elastomeric material is dispensed in the container and mixed with a second colored dye to provide the intermediate layer 4 with, for example, a light blue color. The container is weighed to insure that a sufficient amount of elastomeric material is present therein to form an intermediate layer 4 having approximately a quarter inch thickness. As the layer 4 cures, the elastomeric forming raised or wicked portions 26, which extend along the width of straps C. During this wicking process, a percentage of the elastomeric material becomes embedded in straps C. Since layers 2 and 4 are formed from the same elastomeric material, an adhesive type bond is formed therebetween.

Prior to pouring the top layer 6, the intermediate layer 4 is allowed to harden. The elastomeric material is once again dispensed into a suitable container and the first colored dye, for example, dark blue is mixed therewith to provide the top layer 6 with a dark blue color. The container is weighed to insure that the proper amount of elastomeric material is contained therein to form a top layer 6 having a thickness of approximately one quarter of an inch. As layer 6 cures, the elastomeric material wicks about segments 22 and 24 of straps C thereby forming raised or wicked portions 28 which extend along the width of straps C. Also, a percentage of the elastomeric material becomes embedded in straps C. The top layer 6 bonds to intermediate layer 4, since the layers 4 and 6 are formed from the same material. Once the tool A has sufficiently hardened it is removed from the mold E. Heaters maybe used to expedite hardening of layers 2, 4 and 6.

Once tool A has been extracted from mold E, it is visually inspected to insure that it has been properly formed. More specifically, the intermediate layer 4 is examined to insure that it has a uniform thickness over its entire length. This inspection will reveal any imperfections in tool A by noting variations in thickness of the light blue color. For example, if the mold is disposed on an unlevel surface, one end of the intermediate layer 4 will have a thickness greater than the other end. A tool formed in this manner is likely to leave unintended indentations or imperfections in the concrete adjacent the area having the greater thickness due to the greater weight of the tool in that area. By visually inspecting the tool A, imperfections in the concrete can be easily avoided. It will be readily appreciated from the foregoing that the present invention is a significant improvement over previously known decorative stamping tools.

While this invention has been described as having a preferred design, it is understood that it is capable of further modifications, uses and/or adaptions of the invention following in general the principle of the invention including such departures from the present disclosure as come within the known or customary practice in the art to which the invention pertains, and as maybe applied to the central features set forth herein and fall within the scope of the invention and limits of the appended claims.

I claim:

1. An apparatus for forming an impression in the surface of a moldable material, comprising:
   a) a multi-layer flexible base including first, second and third layers;
   b) said first, second and third layers each having an upper and a lower surface;
   c) said second layer being positioned- intermediate said first and third layers, said lower surface of said third layer has a predetermined pattern formed therein for forming a corresponding impression in a moldable material;
   d) handle means operably associated with said base for permitting said base to be readily transported from one location to another;
   e) said handle means having said first and second segments, said first segment being disposed above said upper surface of said first layer, said second segment extending between said upper surface of said third layer and said first segment; and
   f) at least one of said first and second layers having a raised portion adjacent said handle means for securing said handle means to said base.

2. An apparatus as in claim 1, wherein:
   a) said third layer has a thickness substantially equal to twice a thickness of said first layer.

3. An apparatus as in claim 1, wherein:
   a) said third layer has a thickness substantially equal to twice a thickness of said second layer.

4. An apparatus as in claim 1, wherein:
   a) said third layer has a thickness substantially equal to a combined thickness of said first and second layers.

5. An apparatus as in claim 1, further including:
   a) indicating means for readily indicating whether said first, second and third layers were properly formed.

6. An apparatus as in claim 1, wherein:
   a) at least one of said first, second and third layers is formed from a color different from at least one other layer of said first, second and third layers.

7. An apparatus as in claim 6, wherein;
   a) said second layer is formed from a first color and said first and third layers are each formed from a second color, said first and second colors are different.

8. An apparatus as in claim 1, wherein:
   a) said handle means includes at least a first strap, said first strap includes first and second sections, said first section has a substantially convex shape and said second section has a substantially concave shape.

9. An apparatus as in claim 1, wherein:
   a) notch means is formed in said base for permitting said base to be readily interconnected with other bases.

10. An apparatus for forming an impression in a surface of a moldable material, comprising:
    a) a multi-layer flexible base including first, second and third layers;
    b) said first, second and third layers each having an upper and a lower surface, said second layer being positioned intermediate said first and third layers;
    c) said lower surface of said third layer has a predetermined pattern formed therein for forming a corresponding impression in a moldable material;
    d) at least one closed loop strap being operably associated with said base for permitting said base to be readily transported from one location to another;
    e) said closed loop strap includes first and second segments, said first segment being disposed in said base and said second segment being removed therefrom; and
    f) said first and second layers each having a substantially triangularly shaped raised portion adjacent said closed loop strap to secure said strap to said base.

11. An apparatus as in claim 10, wherein:
    a) said first segment includes first, second and third sections, said second and third sections are positioned adjacent opposite ends of said first section, said first section abuts and extends along said upper surface of said third layer; and
    b) said second layer includes first and second raised portions, said first raised portions is positioned adjacent said second section and said second raised portion is positioned adjacent said third section.

12. An apparatus as in claim 11, wherein:
    a) said first layer includes first and second raised portions, said first raised portion is positioned adjacent said second section and said second raised portion is positioned adjacent said third section.

13. An apparatus as in claim 12, wherein:
    a) said first and second raised portions of said first and second layers are substantially triangularly shaped.

14. An apparatus as in claim 10, wherein:
    a) at least one of said first, second and third layers is formed from a color different from at least one other layer of said first, second and third layers.

15. An apparatus for forming an impression in the surface of a moldable material, comprising:
    a) a multi-layer flexible base including at least first, second and third layers;
    b) said first, second and third layers each having an upper and a lower surface;
    c) said second layer being disposed intermediate said first and third layers, said lower surface of said third layer has a predetermined pattern formed therein for forming a corresponding impression in a moldable material;

d) handle means operably associated with said base for permitting said base to be readily transported from one location to another; and e) indicating means for readily indicating whether said first, second and third layers were properly formed.

16. An apparatus as in claim 15, wherein:

a) at least one of said first, second and third layers is formed from a color different from at least one other layer of said first, second and third layers.

17. An apparatus as in claim 16, wherein:

a) said second layer is formed from a first color and said first and third layers are each formed from a second color, said first and second colors are different.

* * * * *